March 2, 1971   J. H. LEMELSON   3,567,485
ARTICLE COATING METHOD
Filed Oct. 14, 1968   2 Sheets-Sheet 2

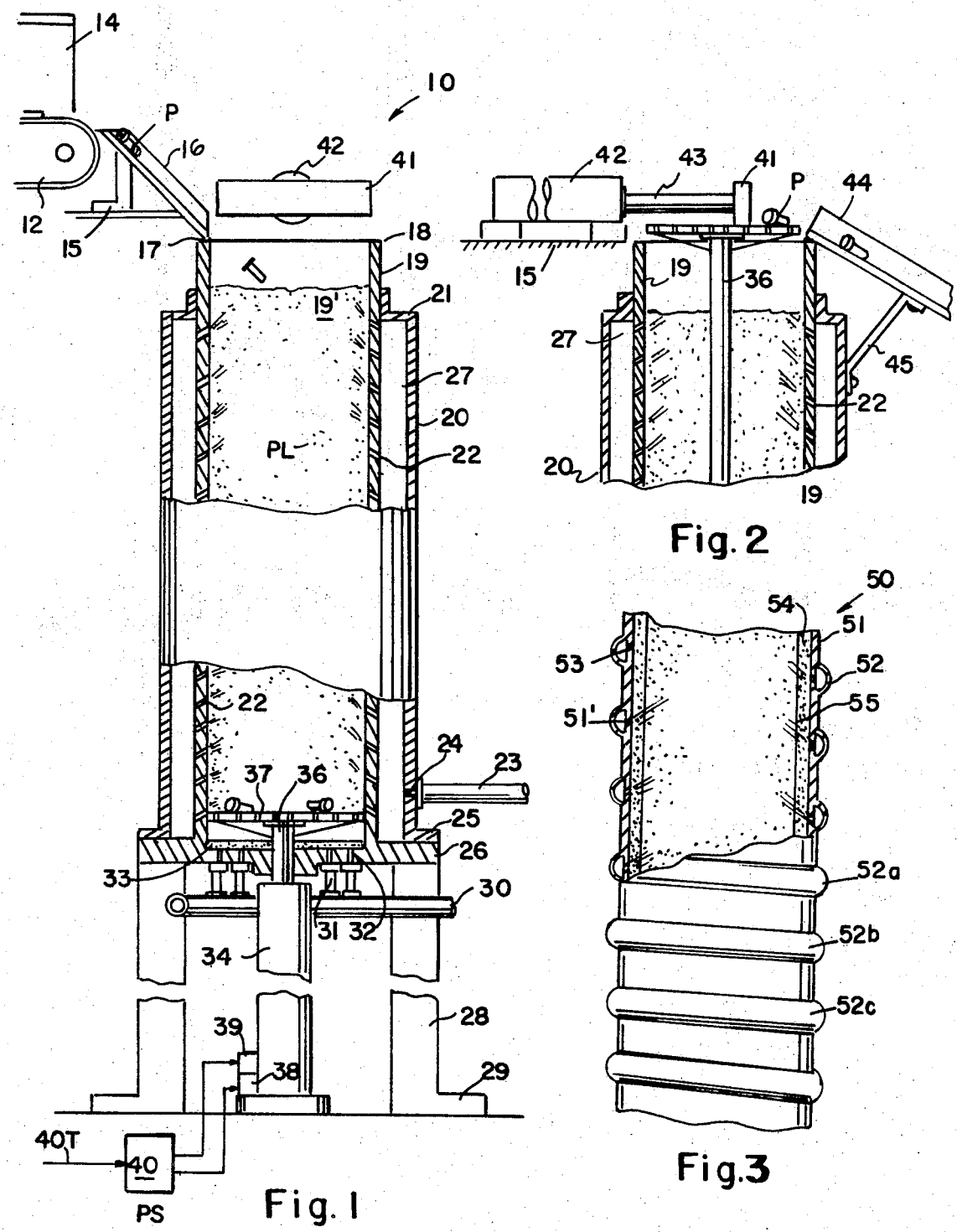

INVENTOR.
Jerome H. Lemelson

United States Patent Office 3,567,485
Patented Mar. 2, 1971

3,567,485
ARTICLE COATING METHOD
Jerome H. Lemelson, 85 Rector St.,
Metuchen, N.J. 08840
Continuation-in-part of application Ser. No. 305,002, Aug. 27, 1963, which is a continuation-in-part of applications Ser. No. 589,848, May 28, 1956, and Ser. No. 589,300, June 4, 1956. This application Oct. 14, 1968, Ser. No. 767,377
Int. Cl. B44c 1/08
U.S. Cl. 117—21
5 Claims

ABSTRACT OF THE DISCLOSURE

An apparatus and method for coating or otherwise treating the surfaces of small articles by passing the articles through a fluidized medium. In one form, a fluidized bed of particles of thermoplastic coating material is generated by passing a gas upwardly through a column surrounded by a jacket or housing and introducing particles of thermoplastic material into said column which particles become fluidized. Thereafter, articles such as metal parts which have been preheated to a temperature above the melting range of the plastic resin so fluidized, are introduced into the top of the chamber and allowed to fall through the fluidized mass. As they fall, they intersect particles of the fluidized mass which melt upon contact with the surface of the articles forming a coating thereon. Depending upon the height of the column and the desired thickness of coating, the articles may be ejected or carried upwardly by a movable receiving device located at the bottom of the column which is activated to either propel the articles from the surface thereof upwardly into the fluidized mass or to carry the articles upwardly into the fluidized mass.

RELATED APPLICATIONS

This is a continuation-in-part of copending application Ser. No. 305,002 filed Aug. 27, 1963, and now abandoned, for Coating Apparatus and Method which is a continuation-in-part of both applications Ser. No. 589,300 filed June 4, 1956 now abandoned, and Ser. No. 589,848 filed May 28, 1956 now U.S. Pat. 3,166,829.

SUMMARY

This invention relates to apparatus and methods for coating or otherwise processing the surfaces of small articles of manufacture such as metal fasteners, fittings and other devices by passing said articles through a fluidized bed of particles.

It is known in the art to coat articles of manufacture with a protective thermoplastic material by racking or hanging said articles in a bed of fluidized particles of said thermoplastic material while the article is heated to a temperature above the melting point of the plastic. U.S. Pat. 3,004,861 and the applications referred to in the preamble of said patent fully described methods and apparatus for fluidizing particles of various thermoplastic resins such as polyethylene, polypropylene, polycarbonate, polyamide, cellulose acetate butyrate, polystyrene and the like provided in powder or granular form and for disposing said articles to be coated immediately adjacent to or within the fluidized bed. Heretofore, small articles requiring coating by this process have been suspended on wires and other forms in the fluidized bed until a desired coating thickness was attained by virtue of the particles melting upon contact with the surface of the article or the heated coating previously formed thereon. The technique whereby articles are hung from wires and other forms is not only tedious and time-consuming to effect such suspension but has required the use of manual labor with the resulting high production cost.

By the means provided herein, small articles are dropped into the upper end of an elongated container defining a column of fluidized particles which are kept in constant agitation therein by the correct flow of a fluidizing gas within the container. The articles are permitted to fall freely through the entire length of the container and out the bottom of the container to a conveyor or, in certain modified forms of the invention, are stopped at the bottom of the container and are thereafter further acted on by either conveyance or ejection upwardly into the fluidized mass to increase the thickness of the coating a desired degree. The apparatus defined herein also may be modified to permit the conveyance of articles from the lower end of the container to the upper end thereof to recycle and redeliver the articles whereby they may be made to fall through the fluidized column more than once until the desired thickness of coating material forms on the surface thereof.

It is, accordingly, an object of this invention to provide a new and improved apparatus and method for coating or otherwise treating articles of manufacture by passing same through a fluidized bed.

Another object is to provide an apparatus and method employing a fluidized bed to coat small articles without the need for racking or suspending said articles from wires or fixtures.

Another object is to provide an improved fluidized bed coating apparatus for small articles which may be operated in a totally automatic manner without the need for manual attendance or labor, thereby substantially decreasing the cost of coating said articles.

Another object is to provide a new and improved coating apparatus employing, in addition to a fluidized bed of coating material, auxiliary means associated therewith for effecting the coating of articles.

Another object is to provide a coating apparatus including a fluidized bed of coating material, means for delivering articles to said bed and means for causing said articles to become temporarily suspended within the bed or to be moved up and down therein without contact with a supporting surface while so suspended or moved so as to permit the entire exposed surface portions of the article to be coated.

Another object is to provide a method for surface-treating articles in a fluidized bed whereby at least one of the fluids introduced into said bed is operative to affect the surface of the articles.

Another object is to provide an improved method for coating articles by passing said articles through a column containing a fluid in motion upwardly therethrough which fluid includes a monomer resin, the method also including means for causing the monomer resin to become deposited on the articles and to polymerize in situ after being so deposited.

These and other objects will become more apparent upon studying the accompanying specification and drawings, in which:

FIG. 1 is a side view with parts broken away and sectioned for clarity of an article coating apparatus having means for depositing small articles into a fluidized bed and lifting said articles upwardly therethrough;

FIG. 2 is an end view of a portion of the apparatus of FIG. 1;

FIG. 3 is a side view with parts broken away and sectioned for clarity of a modified form of the housing of FIGS. 1 and 2;

Figure 4:
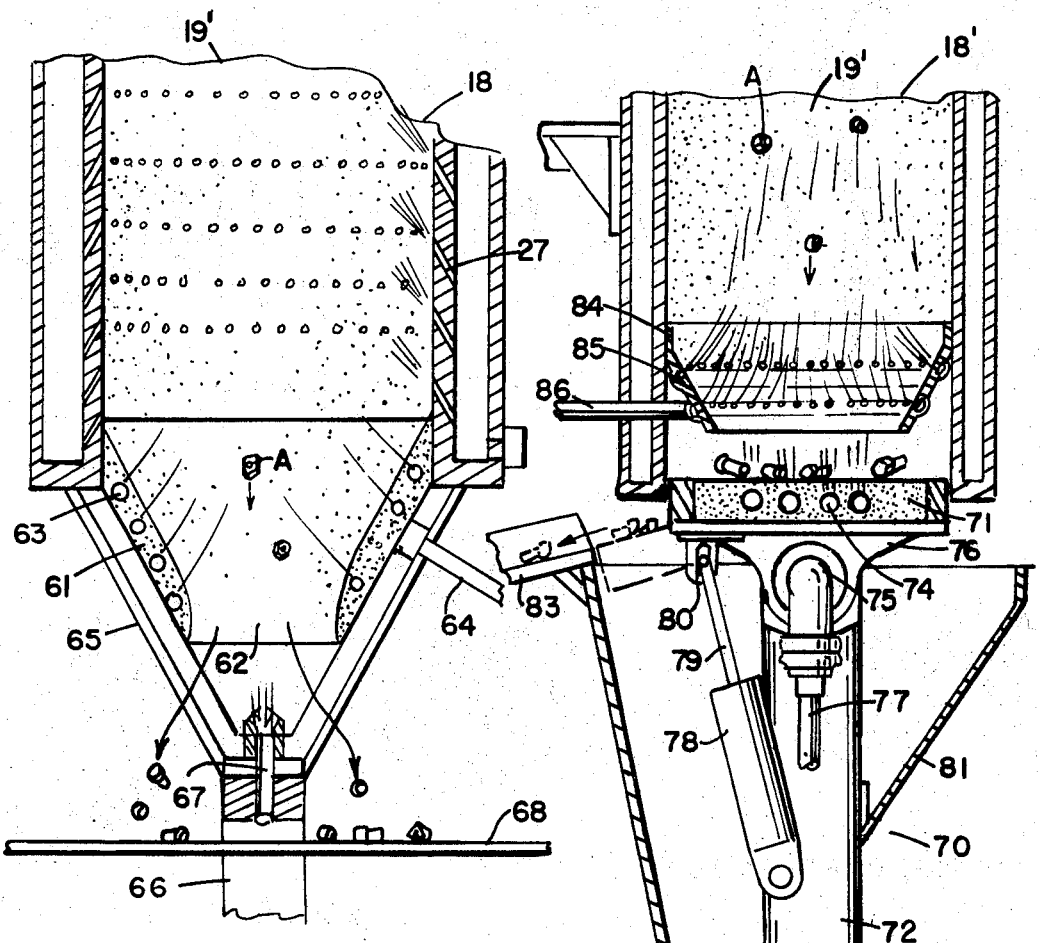
FIG. 4 is a side view with parts broken away for clarity and sectioned of the lower end of a modified form of coating apparatus.

FIGS. 1 and 2 illustrate an article coating apparatus 10 which includes a belt conveyor 12 for conveying a plurality of small articles A through an oven 14 or other suitable heating means for said articles such as an induction coil disposed around the conveyor for presenting the articles passed therethrough at a predetermined temperature by the time they have reached the end of the conveyor 12. The articles are discharged from the conveyor 12 onto a chute 16 having its discharge end 17 disposed at the open upper end of a container assembly 18 so that the articles will fall into said container. Notation 15 refers to a support for the chute 16 which may also be utilized to support the conveyor 12, and/or furnace or oven assembly 14 about the vertically disposed container 18.

The container 18 consists of a concentric array of elongated conduits or pipes including a centrally disposed cylindrical housing or pipe 19 which is surrounded by a second cylindrical container 20 of greater diameter than 19 and defines an annular volume 27 surrounding 19. The upper end of the annular volume 27 is closed by means of a wall 21 secured to the end of 20 and the side wall of 19. The lower end of the volume defined by 20 and 19 is closed by means of a plate 26 extending radially outward from the inner housing 19 and engaged by a flange 25 provided at the lower end of wall 20.

A plurality of inwardly and upwardly disposed holes 22 are provided in the wall of the housing 19 along substantially the length thereof which defines the inner wall of volume 27. Notation 23 refers to an inlet line terminating a pressurized supply of a gas such as air which is admitted to the volume 27 through an opening 24 disposed in the wall of outer shell 20 aligned with the opening at the end of line 23 which is welded or otherwise connected thereto.

The housing assembly 18 is supported on a plurality of legs 28 which are secured at their lower ends 29 to the floor.

A circular header pipe 30 is secured below the lower end of assembly 18 and is utilized for flowing a gas through the end wall 26. A plurality of short sections 31 of tubing are welded to the header 30 and connected to openings 32 in the end plate 26 which openings extend to the bottom face of a porous disc or plate 33 disposed at the lower end of housing 19. Air flowed through the header 30 will thus be ejected as a plurality of streams which are further diffused into a steady flow through the volume interior of 19. Secondary air admitted through inlet pipe 23 to the annular volume 27 is ejected through the plurality of openings 22 in wall 19 and, together with the air flowed through the bottom wall of 19, is effective in producing an upward flow of air through the elongated duct or container in which particles of a coating material such as a powdered or particulate plastic may be fluidized.

Plastics or other materials desired to be formed as coatings on the exposed surfaces of the articles dropped into the top of the container may include powdered or granular metal, glass, polyethylene, polypropylene, polycarbonate, acetate, styrenes, epoxys, or the like may be periodically or continuously disposed in the inlet line 23 and caused to flow therethrough into the annular volume 27 and to pass through the openings 22 therein to maintain a predetermined density in the fluidized mass PL of particles in said container. Thus, if the temperature of the surface of the articles A is above the melting point of the plastic, the fluidized particles which contact said surface will melt thereon and form a coating during the travel of the article down the column 19'.

While discharge of the coated articles may be provided, as hereinafter described, by continuously or intermittently permitting the articles to fall out of the bottom of the container, in FIGS. 1 and 2 means are provided for lifting one or more articles upward through the container and transferring said articles from the top of said container onto a discharge chute 44 as illustrated in FIG. 2. The transfer means, which is illustrated in FIG. 1, comprises a lineal actuator such as an air or hydraulic cylinder 34 disposed between the legs 28 supporting the container and having a ram shaft 36 which is projectable upward through the container and which mounts a platform 37 which is substantially the shape of the inside cross-section of the container and on which articles dropped into the container eventually come to rest. The platform 37 is provided with a plurality of small openings therein and may comprise a screen or grid. The grid structure of the platform is preferably such that it will not substantially interfere with the flow of gas upward through the container and will not accumulate particles of the coating material during its upward travel.

The cylinder 34 is operative to raise the platform 37 with one or more coated articles thereon to a level above the end of the central container 19, whereby a pusher plate 41 may be projected across the surface of 37 by means of a lineal actuator or air cylinder 42 mounted adjacent the assembly 18. When the shaft 43 of 42 is fully extended, the pusher plate 41 attached thereto is in a position whereby it has completely crossed the plate 37 and has pushed all articles A therefrom onto the discharge chute 44 along which they travel to a packaging or further conveying means.

Operation of the air cylinder 34 to raise and lower the platform 37 may be effected in a number of different manners depending on the characteristics of the articles to be coated, the coating material and the desired thickness of coating. Said operation is preferably synchronized to the rate of feed of articles to the inflow conveyor 12 and is effected by means of a multi-circuit, recycling controller or timer 40 which is operatively connected to the forward and reverse controls 38, 39 for the solenoid operating the air cylinder and is interlocked to the operation of the means feeding articles to conveyor 12 by means of a line 40T extending to the trigger input of 40. Several modes of operation are conceived, viz:

(a) Periodic movement of the shaft 36 of the lineal actuator 34 upwardly through the container 18 and delay when at the top of its stroke for a sufficient period of time to permit the bar 41 to sweep completely across the upper surface of platform 37, after which said platform is lowered by retraction of shaft 36 to the position illustrated in FIG. 1 at the bottom of the container.

(b) If a heavier coating of plastic is desired on the surface of the article than would ordinarily be derived during its free fall downward through the fluidized bed, the controls for the actuator 34 may be energized so as to cause upward and downward movement of the shaft 36 a degree such that the article or articles disposed on the platform will be thrown upward into the fluidized mass exposing those surfaces thereof which came to rest on the platform to particles of said mass and the action may be continued for a predetermined period of time necessary to provide the desired thickness of coating on the entire exterior surface of the article. Such oscillating movement of the shaft 36 may be accomplished while said shaft is fully retracted and/or at different levels during its upward movement through the fluidized bed so as to maintain the articles in a constant state of movement through the fluidized bed.

(c) In the third mode of operation, the shaft 36 may be constantly oscillated up and down during its movement up the container so as to impulsively project articles falling onto its upper surface into the fluidized mass immediately above said platform.

(d) In a fourth mode of operation, the fluid ejected from the head 30 at the bottom of the column and/or auxiliary fluid ejected from the platform 37 may be utilized to suspend articles to be coated, provided they are light enough in weight, directly above the platform so that said articles never come to rest on the platform during the coating process. Such auxiliary jets of fluid may also be operative to raise the articles for ejection from the column at the top end of the assembly by the upward movement of the platform containing the fluid ejection means whereby the articles suspended above the platform will continue to be suspended as the platform moves upward. Or, said articles may be expelled from the bottom of the container by means described hereafter.

FIG. 3 shows another structure in a fluidizing container or column of the type that was illustrated in FIGS. 1 and 2 but having a cylindrical wall 51 produced of a sheet of metal having an integral conduit of the type provided in parent applications Ser. No. 589,300 and No. 589,848. In FIG. 3, the cylindrical outer wall 51 is made of a sheet of such metal having three conduit formations 52A, 52B and 52C extending longitudinally along said sheet and parallel to each other which formations provide respective helical conduits around the side wall of the cylindrical shell 51 when the edges of said sheet are welded together into a cylindrical conduit as illustrated. The sheet 51 is shown wrapped around a cylinder 54 made of porous metal or ceramic and defining the inside liner therefor. A plurality of holes 53 are drilled or otherwise provided in those portions 51' of the sheet 51 which define the flat inside wall of the conduits so that if said conduits are pressurized with a fluidizing gas, flow will be effected through said openings 53 in an upward direction through the porous wall and flow outwardly from the inside surface 55 thereof to effect or enhance fluidizing gas flow.

FIG. 4 illustrates a modification to the apparatus hereinabove described in which small articles A admitted to the top end of the fluidizing column are permitted to fall therefrom or be expelled from the bottom of the column either at the end of their free fall therethrough or a predetermined period after coming to rest at the bottom of the column. In FIG. 4, a frusto-conical shell 61 having an opening 62 at its lower end, defines the lower wall for the columnar container assembly 18 and is made of a porous ceramic or metal. Fluidizing gas is introduced into the porous member 61 through a line 64 connected thereto and communicating with a plurality of hollow interior passageways 63. The gas is thus directed upward through the column interior 19' as a flow sufficient to sustain fluidization of particles introduced into the top end of said container. A spider-frame 65 is connected to the porous member 61 for supporting the columnar assembly 18 although an externally secured frame may also be utilized to support said column per se or in co-action with 65. The spired-frame 65 is illustrated as supporting a conduit 67 extending through the base 66 thereof through which air is also upwardly ejected at a flow to prevent fluidizing particles from falling through the open end 62, although means may be provided for recirculating any particles which do fall therethrough.

Accordingly, the articles admitted to the upper end of the housing assembly 18 may fall through the opening 62 onto a closed loop belt conveyor 68 disposed beneath the assembly and either conveyed away from the apparatus or transferred to the top end of the column to be passed again therethrough to increase the thickness of the coating.

Figure 5:
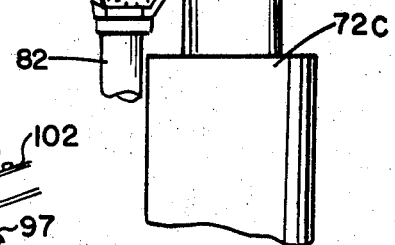
FIG. 5 is a side view with parts broken away for clarity of a modified form of the apparatus shown in FIGS. 1 and 2.

In FIG. 5 is shown an arrangement whereby articles A or objects discharged into an elongated fluidizing column may be retained within the fluidizing bed for a predetermined period of time and thereafter discharged from the lower end of the column. Situated at the lower end of the fluidizing container assembly 18' is an assembly of a porous plate 71 and a support 76 therefor. The plate 71 is pivotally mounted on said support on a bearing 75 which is also a rotary fluid coupling. Fluid admitted through a line 77 to the coupling 75 is ducted to a plurality of passageways 74 in the porous plate 71 and is passed therefrom upward into the interior of the fluidizing column. A lineal actuator such as an air cylinder 78 mounted on and supported by the support 76 is operable to project and retract its arm 79 for pivotally moving the plate 71 from the horizontal position illustrated to a position whereby articles disposed thereon will slide off said plate into a container or chute 83 disposed immediately beneath the assembly. A deflection plate or hopper 84 provided within the fluidizing container is operative to receive articles falling down the column and to deflect them onto the central portion of 71. The deflection member 84 is preferably made of perforated metal and has a fluid inlet conduit or header 85 integral therewith for flowing gas upward through the fluidizing column to retain sufficient flow while the plate 71 is tilted to prevent fluidizing particles from falling out of the column. Notation 79 refers to the shaft of actuator 78 and 80 to a slide bracket secured to the end of said shaft to complete the linkage therewith so that the plate 71 may be tilted upon outwardly projecting shaft 78.

In the embodiments hereinabove described and illustrated in FIGS. 1–5, means are preferably provided at the bottom of each of the containers for collecting particles of coating retained within the fluidized bed for a predetermined period of time to allow formation of a coating of predetermined thickness and thereafter discharged from the lower end of the housing.

Situated at the lower end of the tubular housing 18' is an assembly 70 comprising a vertically movable mount or arm 72 which may be the shaft of a hydraulic or air cylinder 72C which is actually aligned with and beneath the vertically disposed fluidizing chamber assembly 18' as illustrated. Pivotally secured at the upper end of 72 is a support 76 including a porous plate 71 of resilient or porous structure and having a plurality of passageways 74 extending therethrough, which passageways communicate with the volume adjacent the upper surface of 71 so that fluidizing gas admitted to the passageways will escape and flow upward therefrom. Said fluidizing gas is introduced from a flexible line 77 which is connected to a rotary coupling 75 located at the axis of rotation of the platform 71 at the end of shaft 72. Upward movement of the shaft 72 when the lineal cylinder 72C is actuated will raise platform 71 so as to position said platform within the working zone defined by the chamber assembly 18' so as to close off the lower end thereof.

After a predetermined number of articles A have been dropped into the upper end of the fluidizing chamber 18' and are retained on the upper surface of platform 71 for a predetermined period, the shaft 72 is automatically lowered a predetermined degree and the platform tilted so as to cause the articles resting thereon to slide off onto a receiving conveyor or chute 83 as illustrated. Tilting of the platform 71 when shaft 72 has attained the lowermost position in its stroke, is effective by means of a small lineal actuator 78 secured to the shaft 72 and having a shaft 79 which engages a slotted bracket 80 which is secured to the underface of the platform. Thus retraction of shaft 79 is operative to tilt the platform 71 to the position illustrated by the broken lines, so as to discharge articles therefrom onto the receiving chute 83.

Other details of the apparatus of FIG. 5 include the provision of a frusto-conical hopper 84 within the interior of the fluidizing chamber 18' and made of a sheet of metal containing one or more conduits 85 formed therein which communicate by means of a plurality of holes with the interior surface of 84. Fluidizing gas admitted to said integral conduits 85 through an inlet pipe 86 is thus caused to flow inwardly and upward within the chamber to enhance fluidizing of the particles therein which may be admitted through 86 or from the top of the chamber. The sheet formation 84 also serves the dual function of deflecting articles toward the center of the chamber so that they come to rest near the center of the platform 71.

Also shown in FIG. 5 is a second hopper 81 disposed beneath the lower end of 18' and shaped so that any particles which may fall off the upper surface of 71 or escape from the fluidizing mass and fall downward from 18' when the platform is downwardly retracted, will be caught thereby. At the lower end of 81 is a tube 82 to which suction is applied for removing particles from the hopper 81. Tube 82 is connected so as to recirculate said particles into the fluidizing bed generated within 18' by carrying them to the upper end of volume 19'.

The apparatus of FIG. 5 may be operated by merely advancing shaft 72 upwardly to position the platform across the end of 18' or by vertically oscillating shaft 72 as described so as to cause the articles disposed thereon to be thrown upwardly into the fluidizing mass a number of times prior to lowering and tilting the platform.

Figure 6:
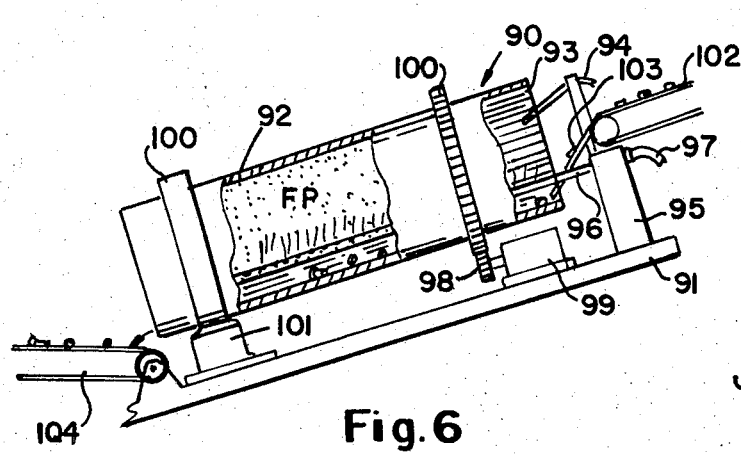
FIG. 6 is a side view with parts broken away and sectioned for clarity of another form of coating apparatus embodying features of the instant invention.

FIG. 6 illustrates a rotating fluidizing apparatus 90 of the type hereinabove described which includes an elongated, cylindrical chamber 92 which is open at both ends and is mounted for rotation about its longitudinal axis which is disposed oblique to the horizontal. The chamber 92 is supported by means of ball or roller bearings provided within two or more large pillow blocks 100 which are mounted on a platform 91 which is supported oblique to the horizontal. A small spur gear 98 secured to the shaft of a constant speed motor 99 engages a large gear 100 extending circumferentially around and secured to the outer surface of 92. Thus, as the motor 99 operates, chamber 92 will be rotated at a predetermined speed. Notation 93 refers to corrugations or other suitable formations provided in or attached to the inside surface of the wall of 92 for carrying the particles a predetermined degree upward within the chamber after which they fall off the wall and tumble downward through the fluidizing mass FP to the bottom of the chamber and towards the lower end thereof. Particulate material, such as particles of nylon, polyethylene, polypropylene, polycarbonate or the like, are introduced as a steady stream through an inlet nozzle 94 extending into the interior of 92 and those particles which are carried out the lower end of 92 fall onto a conveyor belt 104, which is adapted to also receive the coated articles, and are removed therefrom by suitable vacuum or other means situated further along the belt but not illustrated.

Extending longitudinally along the lower portion of the interior volume of 92 are a plurality of tubes or conduits 96 which are supported on a base 95 secured to platform 91. The tubes 96 receive fluidized air or gas from a hose 97 and are provided with a plurality of upwardly disposed holes therein along the length of each tube for flowing the gas admitted thereto in an upwardly direction through the interior of the chamber defined by 92 and for retaining particles admitted thereto in a fluidized condition. The number of conduits 96, diameter and spacing of the holes therein and rate of flow of fluidizing gas will depend upon the dimensional parameters of the particles and the apparatus illustrated. For certain types of coating, fluidizing gas may be shut off and the heated articles merely tumbled in a mass of particulate material continuously admitted to the upper end of 92 which is discharged onto and removed from the conveyor 104 by air flow or other means.

Articles to be admitted to the chamber 92 are introduced on a continuously moving belt conveyor 102 and fall onto a chute 103 at the discharge end thereof, which chute extends into the chamber 92 as illustrated, and conveys articles thereto from the inlet conveyor. A blast of air ejected from one or more nozzles and directed across the face of the lower end of 92 may be utilized to separate particulate material falling therefrom from the articles and to direct said material into a hopper or receiving chamber for recirculation to the inlet conduit 94.

Further improvements and variations in the apparatus of FIGS. 1 to 6 are hereinafter noted.

Certain articles to be coated with fluidized particulate material may be suspended in the fluidized bed for a period of time without being attached to a fixture. By one method, small lightweight articles may be suspended on one or more jet streams of air or the fluidizing gas directed, for example, from the bottom of the fluidizing tank or from one or more conduits disposed within the fluidizing tank. In FIG. 1, for example, one or more of the inlet lines 31 may communicate through holes drilled in the porous plate 33 directly with the interior of the tank 18 for directing jets of air upward through the chamber on which small articles disposed therein will float until the velocity of the air is reduced. The articles, which may first be allowed to come to rest on the platform 37 and thereafter suspended, are allowed to float in the chamber in an atmosphere which includes particles of coating material and said floating condition is maintained until a coating of predetermined thickness has deposited on the surface of the article which has been previously heated to the required temperature. Thereafter, the velocity of said jet streams is reduced permitting the articles to come to rest on the platform and the articles are removed from the tank as described. Retention of the articles in the floating condition within the tank may be maintained until the temperature of the surface of the article or coating material has lowered a degree whereby the article coating will not deform or become adhered to the surface of the platform 37 or porous plate 33. In order to reduce or prevent adherence of the coating material to the platform or grating, it may be coated with a plastic such as polytetrafluorethylene or Teflon. The jet streams which float the articles above the platform may also be generated at upwardly directed openings in the cross-members of the platform which may be hollow and adapted to receive pressurized gas whereby the articles will always be suspended in the gas streams above the platform and will move upwardly through the tank as the platform rises as in FIG. 1 or will follow the platform 71 of FIG. 5 as it lowers to discharge the articles from the bottom of the tank so that the articles will not come into surface abutment with the platform during and immediately after coating. Further arrays of upwardly directed air jets disposed along discharge conveyors 44 or 83 may be arranged to receive the articles transferred thereto by the respective platforms and may be operative to continue to float and transfer articles, while the coating material is still soft or semi-molten, to a further station such as a storage or packaging apparatus.

Ferro-magnetic articles may also be floated in a stream of particulate coating material or a fluidizing bed of particles by the generation of a magnetic field or fields which are operative to keep said articles in a suspended condition. For example, the platforms 37 or 71 may be provided with controllable electromagnetic means for generating a magnetic field immediately above the platform to suspend articles disposed therein above said platform. Again, the field may be maintained during the entire period the articles are in the tank, in the fluidized bed, or subject to fluidized particles and/or at a temperature whereby the coating is molten or semi-molten such that contact with a surface will affect the coating or cause adherence thereto. Temperature control of the fluidizing and/or jet stream gas admitted to the tank may also be utilized to affect and improve the coating material and operation. For example, hot gas admitted initially and/or during most, if not all, of the coating operation may be utilized to render the coating particles near the temperature of the surface to be coated so as to reduce the time needed to effect a particular coating thickness. This will also permit the article to be heated to a temperature which is lower than that which would ordinarily be needed to effect a similar coating function so that the delay necessitated to permit the article to drop in temperature to where the coating fuses or solidifies, is reduced. Once the desired coating thickness has been attained, the temperature of the fluidizing and/or jets of gas may be lowered a degree whereby heat will be rapidly transferred from the article and coating material thereon so as to permit removal of the article from its suspension or the platform surface shortly thereafter.

Induction heating means disposed within the walls of the tank, outside said walls or within the interior volume of the tank defining the fluidizing column may be utilized to heat articles suspended, as described, within the tank on streams of gas to effect melting of particles directed thereagainst either in fluidized state or on jets of gas whereby the desired coating is applied to the surface of the article. The generation of said jets of suspending gas, control of the temperature thereon, flow of particulate material thereto, induction heat means operation, etc. may all be controlled by a program controller to predetermine a coating cycle and the resulting applied coating. One or more induction heating coils may be disposed, in addition to within the walls of the tank or the annular volume surrounding the inner wall thereof, within the fluidizing column itself in positions to heat, by induction, the articles suspended or otherwise disposed therein. Heating of the articles suspended or other disposed within the coating tank may be effected by radiation means such as by means of an intense electron beam or beam of laser generated intense coherent light directed against said articles within the tank, or prior to admission thereto.

What is claimed is:

1. A method of coating small articles of manufacture comprising:
    generating a fluidized bed of coating material in particulate form by upwardly directing a flow of gas through a container in which coating particles of said coating material have been disposed,
    heating a plurality of articles to be coated above the melting temperature of said coating material and causing said articles to fall freely into said container from the upper end thereof and to travel downwardly by gravity through said fluidized bed so as to intersect the fluidized particles thereof while the articles are in said container,
    causing said fluidized particles intersecting said articles to fuse together and adhere to said articles, and conveying said articles thereafter upwardly into said fluidized bed so as to retain said articles in said bed for a greater period of time than it takes for the articles to fall freely to the bottom of said container so as to increase the thickness of the coating on each article, and
    after a predetermined thickness of coating material has formed on said articles, removing the articles from said container.

2. A method of coating articles in accordance with claim 1 whereby the conveying of said articles upwardly into said fluidized bed is effected by causing said articles to fall onto a platform within said container and driving said platform upwardly through said container to cause said articles to be directed upwardly into said fluidized bed and to be exposed to the particles thereof for an additional period of time.

3. A method in accordance with claim 2, whereby said platform is driven upwardly in a manner such as to cause the articles thereon to be propelled off the surface of the platform through said fluidized bed.

4. A method in accordance with claim 3, whereby said platform is intermittently driven upwardly a number of times at time intervals such as to permit said articles to fall by gravity back onto said platform prior to being projected upwardly again through said fluidized bed.

5. A method in accordance with claim 1, whereby said container is inclined to the horizontal and is supported for rotation about an axis inclined to the horizontal, and said articles are retained in said fluidized bed for a greater period of time than it would take for the articles to fall through said container by rotating said container in a manner to convey the articles upwardly and, when the articles reach a high point, to permit said articles to fall downwardly through said fluidized bed in said container.

References Cited
UNITED STATES PATENTS

| | | | |
|---|---|---|---|
| 2,987,413 | 6/1961 | Dettling et al. | 117—21 |
| 2,059,983 | 11/1936 | Dent et al. | 51—278 |
| 2,729,598 | 1/1956 | Garbo | 202—25 |
| 2,833,241 | 5/1958 | Crowley et al. | 118—62 |
| 3,001,228 | 9/1961 | Nack | 117—21X |
| 3,085,905 | 4/1963 | Drevot et al. | 117—106X |
| 3,183,113 | 5/1965 | Gemmer | 117—21 |
| 3,252,830 | 5/1966 | Cummin et al. | 117—106X |
| 3,255,036 | 6/1966 | Kramer et al. | 117—100 |
| 3,382,093 | 5/1968 | Nack | 117—100S |
| 3,397,085 | 8/1968 | Cariou et al. | 117—106X |

WILLIAM D. MARTIN, Primary Examiner

R. M. SPEER, Assistant Examiner

U.S. Cl. X.R.

117—109; 118—404, 418, 425